United States Patent
Sauvat et al.

(10) Patent No.: US 6,446,947 B1
(45) Date of Patent: Sep. 10, 2002

(54) ANTI-VIBRATION MOUNT FITTED WITH A NON-EXTENSIBLE LIMITING CABLE

(75) Inventors: Gilles Sauvat, Cloyes sur Loir; Jean Lor, St Brieuc; Hervé Visage, Chateaudun; Sylvain Durand, Villorceau, all of (FR)

(73) Assignee: Hutchinson, Paris (FR)

( * ) Notice: Subject to any disclaimer, the term of this patent is extended or adjusted under 35 U.S.C. 154(b) by 0 days.

(21) Appl. No.: 09/587,761

(22) Filed: Jun. 6, 2000

(30) Foreign Application Priority Data

Jun. 9, 1999 (FR) .............................................. 99 07263

(51) Int. Cl.$^7$ ................................................ F16F 13/00
(52) U.S. Cl. ................................ 267/140.12; 267/141.2
(58) Field of Search ........................ 267/140.11, 140.12, 267/140.13, 141.2, 152, 153; 24/17 AP, 129 D, 300

(56) References Cited

U.S. PATENT DOCUMENTS 4,942,075 A * 7/1990 Hartel et al. ................. 428/109

5,330,163 A 7/1994 Bodin et al. ........... 267/140.13

FOREIGN PATENT DOCUMENTS

| EP | 0 213 043 | 3/1987 |
| EP | 0 518 759 | 12/1992 |
| EP | 0 622 560 | 11/1994 |
| EP | 0 762 012 | 3/1997 |
| FR | 2 340 834 | 9/1977 |
| FR | 2 587 072 | 3/1987 |

* cited by examiner

*Primary Examiner*—Pam Rodriguez
(74) *Attorney, Agent, or Firm*—Marshall, Gerstein & Borun

(57) ABSTRACT

This anti-vibration mount, comprising a base and a head connected by an elastomer body, is intended to be interposed between two rigid elements to damp the vibrations between these two elements, on a central axis. This mount comprises a non-extensible limiting cable forming a loop, which is fixed to the base and to the head, this cable comprising a first part which is supported on the head by winding around it and which extends towards the base from the head, and a second part which runs along at least a first portion of the periphery of the base and winds around at least a first return element integral with the base, level with two joints between this second part and the first part of the cable, the cable being restrained by the return element.

14 Claims, 4 Drawing Sheets

ANTI-VIBRATION MOUNT FITTED WITH A NON-EXTENSIBLE LIMITING CABLE

FIELD OF THE INVENTION

The present invention relates to anti-vibration mounts intended to be interposed between two rigid elements to damp vibrations between these two elements essentially on a central axis, this mount comprising:
- an elastomer body substantially centered on the central axis,
- a rigid base fixed to the elastomer body and including a periphery surrounding said elastomer body, this periphery extending substantially in a plane perpendicular to the central axis,
- a rigid head fixed to the elastomer body and offset from the base along the central axis, and
- at least a first non-extensible cable formed as a loop, which is fixed to the base and to the head to limit the distance between said base and said head, the cable comprising a first part supported on the head by winding around it and extending towards the base from said head.

BACKGROUND OF THE INVENTION

Limiting cables of this kind which are currently in use are generally formed by non-extensible cables wound around anti-vibration mounts in a plane parallel to the central axis. The document EP-A 0 518 759 describes an example of an anti-vibration mount including such a limiting cable.

The disadvantage of cables of this type lies in the fact that when the mounts are of large dimensions the cables themselves must be of large dimensions and, furthermore, of sufficient strength. In this case the cables require a large amount of material for their manufacture, making them relatively expensive.

Another disadvantage of these cables is that they reduce the portions of the support surfaces of the anti-vibration mounts which allow the mount to be connected between the two rigid elements. Thus the fatigue strength of, especially the caps which may form one of the support surfaces of these anti-vibration mounts is diminished.

U-shaped limiting cables intended to surround only one part of the anti-vibration mounts also exist. For this purpose they comprise a central section attached to the head of the mount, the two free ends of the central section being fixed to diametrically opposed portions of the base of the mount. However, these cables are not satisfactory, as there is a risk that their free ends may become detached from the base through tearing out of the ferrule crimped or cast on to the said free ends, and/or by the rupture of the areas of the base to which these ferrules are attached.

OBJECTS AND SUMMARY OF THE INVENTION

A primary objective of the present invention is to remedy the above-mentioned disadvantages of anti-vibration mounts with limiting cables forming a loop, without incurring the disadvantages of the U-shaped limiting cables.

To this end, an anti-vibration mount of the kind in question, with a limiting cable forming a loop, is characterized essentially in that it comprises a second part which is arranged along at least a first portion of the periphery of the base, said second part complementing the first part of the first cable to constitute said loop formed by the first cable, the first cable thus being wholly comprised between the periphery of the base and the head, and in that the second part of the first cable winds around at least a first return element forming part of the periphery of the base, level with two joints between said second part and the first part of the first cable, the first cable being restrained by the first return element in such a manner that said first return element prevents any displacement of the second part of the first cable towards the head.

Thus, the cable surrounds the anti-vibration mount on only one part of its height, so that the part of the mount situated opposite the head can be left completely free, this part being able to be formed, in particular, by a rigid cap fixed to the base.

In preferred embodiments of the invention, one or more or the following arrangements might also be used:
- the second part of the first cable extends in a plane substantially perpendicular to the central axis;
- the two joints between the first and second parts of the first cable are contained respectively within first and second intersecting planes which pass through the central axis and form an included angle of between about 90° and about 180°;
- the angle between the first and second intersecting planes is of between about 160° and about 180°, so that the first part of the first cable extends in a plane substantially parallel to the central axis and adjacent to this central axis;
- the first part of the first cable extends in a plane forming an acute angle with the central axis;
- the first cable is formed in one piece;
- the first cable comprises, about the middle of its second part, two free ends which are connected together by a connecting means; thus, the free ends of the first cable, which are arranged in a manner sufficiently far from the stressed zones of the base, are subjected only to weak traction stresses, a large part of the traction stresses being absorbed by friction between the first cable and the periphery of the base;
- said first return element is formed by a rigid, fixed projection;
- the first cable is held in position in relation to the mount by retaining means;
- the retaining means are formed by an elastically deformable strap having two ends integrated with the first cable in the vicinity of the two joints between the first and second parts of the first cable respectively, this elastically deformable strap being arranged around a second portion of the periphery of the base, this second portion being complementary to the said first portion of the periphery of the base;
- the retaining means include at least two second return elements which are arranged in a fixed position on the periphery of the base, in the vicinity of the two joints between the first and second parts of the first cable respectively, and extending outwardly in two opposite directions, the second part of the first cable winding between the first and second return elements along a sinuous path;
- the retaining means include at least two third return elements which are arranged in a fixed position on the periphery of the base, in the vicinity of the second return elements respectively, and extending outwardly in two opposite directions, the first part of the first cable winding between the second and third return elements along a sinuous path;

the periphery of the base is provided with two first return elements which extend outwardly in two opposite directions respectively, said first part of the first cable being supported on said first return elements level with each of its two joints with said second part of the first cable respectively;

a second non-extensible cable, analogous to the first cable, is fixed to the base and the head opposite to the first cable.

BRIEF DESCRIPTION OF THE DRAWINGS

Other characteristics and advantages of the present invention will appear in, the course of the following detailed description of six of its embodiments, which are given as non-exclusive examples, with reference to the attached drawings.

In the drawings.

MORE DETAILED DESCRIPTION

Figure 1A:
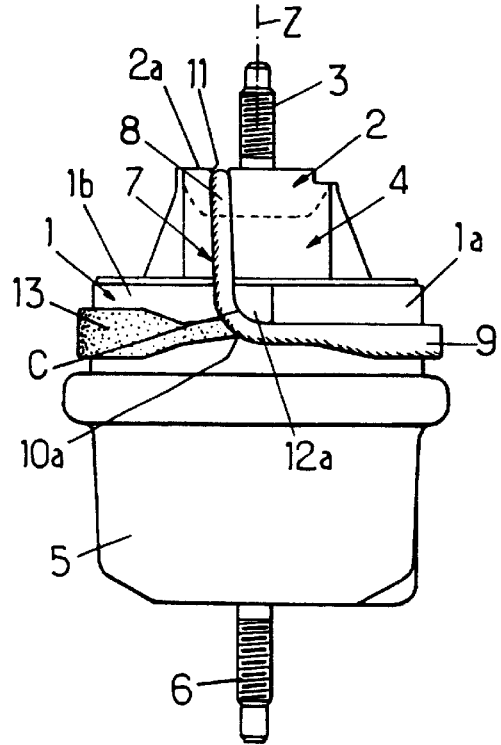
FIGS. 1A to 1C are, respectively, side, front and top views of an anti-vibration mount according to a first embodiment of the invention.

With reference to FIGS. 1 to 6, the anti-vibration mount according to the invention comprises principally:

a metallic outer base 1 having, for example, the form of a revolution around an axis Z which may be, in particular, vertical, this base comprising an outer annular periphery extending substantially in a plane perpendicular to axis Z, a metallic upper head 2 itself forming a revolution around the axis Z and integral with a free stud 3 projecting upwardly, an elastomer body 4 substantially centered on the central axis Z and connecting the base 1 to the head 2, this body 4 being, for example, tapered, and being moulded and bonded, for example, by vulcanisation, over substantially the whole external periphery of the head 2, and over substantially the whole of the internal periphery of the base 1, the elastomer body 4 being able to enclose, for example, a working chamber filled with liquid, a metallic cap 5 fixed rigidly to the lower edge of the base 1, which cap is integral with a free stud 6 projecting downwardly, this cap being able to conceal, for example, an elastomer bellows which encloses a compensation chamber filled with liquid and communicating with the working chamber by a restricted passage, and at least one cable 7 forming a loop and fixed to the base 1 and to the head 2, said cable having, for example, a circular cross-section and being formed of a non-extensible material such as a non-ductile metal, a textile or a similar material which is, for example, coated in elastomer.

By way of indication, the base 1, the head 2 and the cap 5 of the anti-vibration mount may be made of cast aluminium.

Figure 1C:
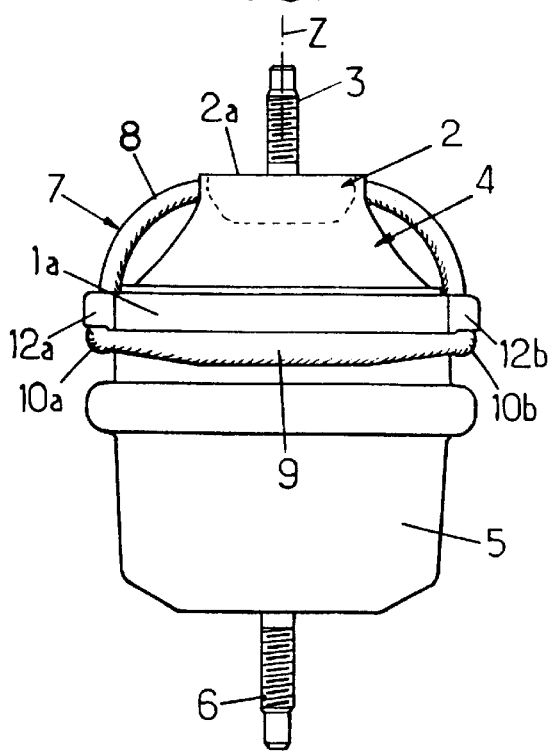
Figure 1B:
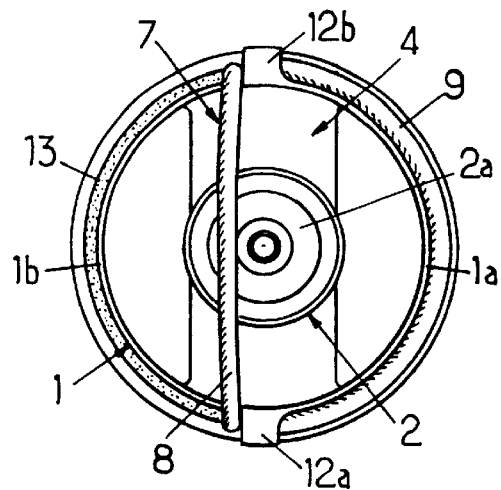
Figure 1D:
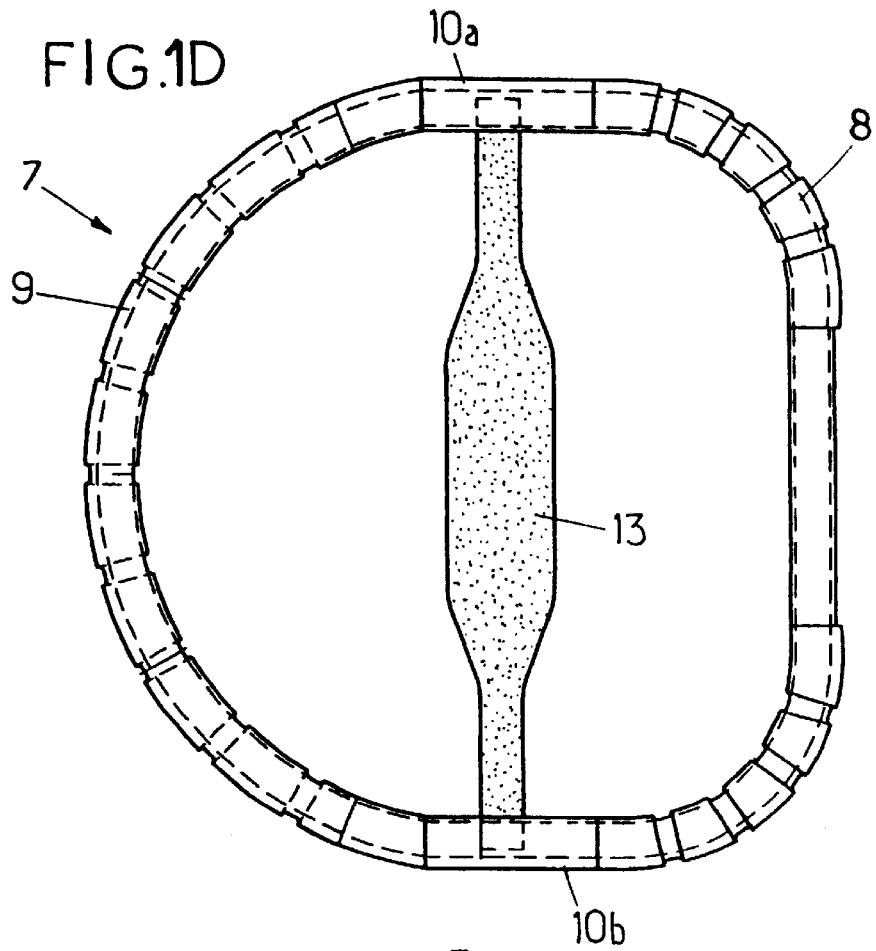
FIG. 1D is a top view showing the cable of the anti-vibration mount in FIG. 1 before assembly

As, can be better seen in FIG. 1D, the cable 7, which is fitted, more particularly, to the first embodiment of the anti-vibration mount shown in FIGS. 1A to 1C, is formed in one piece. In its initial state the cable has the form of a flat ring which comprises a first, substantially semi-rectangular part 8, a second, substantially semicircular part 9, with rounded corners, and two substantially straight parts 10a and 10b which form, respectively, two opposed joints each connecting the first part 8 to the second part 9.

The first part 8 is so dimensioned that, once bent perpendicularly to the second part 9 in the vicinity of the two joints 10a and 10b, in its operating position, its long side rests and is held in a groove 11 formed in the upper surface 2a of the head 2 and its short sides extend substantially axially in the direction of the base 1, in zones which are diametrically opposite in relation to the elastomer body 4 respectively.

The second part 9 of the cable 7 has an internal diameter close to the external diameter of the base 1, so that, in the operating position, as can be seen in FIGS. 1A to 1C, the second part 9 of the cable winds tightly around one half of the outer periphery of this base, for example, the right-hand half 1a.

To ensure that the cable 7 is retained securely enough to withstand the different traction stresses applied to the anti-vibration mount, two rigid projections 12a and 12b, which are, for example, metallic and of appropriate dimensions, are arranged on the base 1 in two diametrically opposed directions. These projections 12a and 12b are so positioned on the base 1 that when the cable 7 is in the operating position they each form a return stop, around which the second part 9 of the cable 7 is wound level with, respectively, the two junctions 10a and 10b between the latter and the first part 8 of cable 7.

As can be better seen in FIG. 1A, the projections 12a and 12b each include a portion C forming the side of the projection which is located laterally nearest the axis Z, the curved contour of which portion C is followed by parts 10a and 10b of the cable 7.

The parts 10a and 10b of the cable 7, which have the advantage of being diametrically opposed, allow the full height of the head 2 to be surrounded by the first part 8 of the cable 7, and allow half the diameter of the base 1 to be surrounded by the second part 9 of the cable 7. The mount is thus limited in traction in the optimum way, and this with the aid of a single cable.

In the example shown in FIGS. 1A to 1D, the cable 7 also includes a strap 13 made of an elastically deformable material, which is fixed by its free ends to the parts 10a and 10b of cable 7. The strap 13 is preferably moulded in elastomer in one piece with cable 7.

As can be seen with reference to FIGS. 1A to 1D, the strap 13 is intended, when the cable is in the operating position, to be stretched so as to wind tightly around the other half of the outer periphery of the base 1, that is, the left-hand half 1b. In this way cable 7 is more securely held in position around the anti-vibration mount.

Figure 2A:
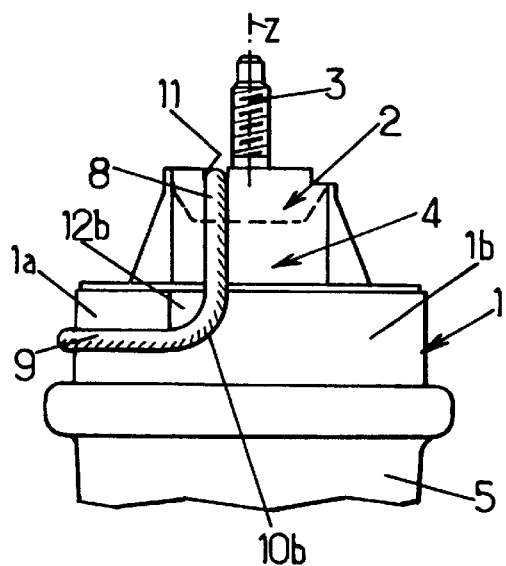
FIGS. 2A and 2B, 3A and 3B, 4A and 4B, 5A and 5B are, respectively, partial views analogous to FIGS. 1A and 1B, for second, third, fourth and fifth embodiments of the invention respectively.
Figure 2B:
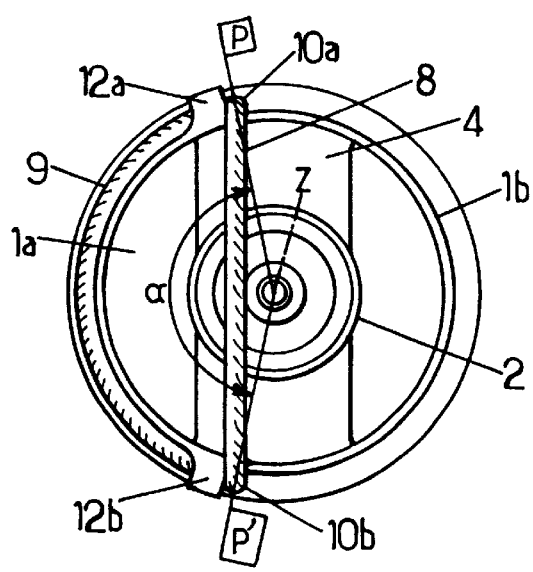

With reference to FIGS. 2A and 2B, the second embodiment illustrated is analogous to the first embodiment, and differs from it primarily by a slightly different arrangement of the projections 12a and 12b.

In this example, the projections 12a and 12b are still opposite each other, but, are no longer diametrically opposed in relation to the base 1. More precisely they are so arranged on the half 1b of the base 1 that the two joints 10a and 10b of cable 7 are contained within the two intersecting planes P and P' respectively, the secant of planes P and P' being formed by axis Z.

In the example shown, planes P and P' form an included angle α of about 165° so that the first part 8 of cable 7 remains in a plane substantially parallel to axis Z and close to it, thus continuing to wind around practically the full height of the head 2.

This second embodiment has the benefit of continuing to hold together the base 1 and the head 2 sufficiently strongly by means of a single cable 7, with the advantage in this case that cable 7 is of smaller dimensions than the cable used in the first embodiment shown in FIGS. 1A to 1C. The second embodiment is therefore more economic to produce.

Moreover, in the example illustrated, and as was envisaged in the first embodiment, cable 7 may or may not be fitted with a strap 13 to improve the connection between base 1 and head 2.

Figure 3A:
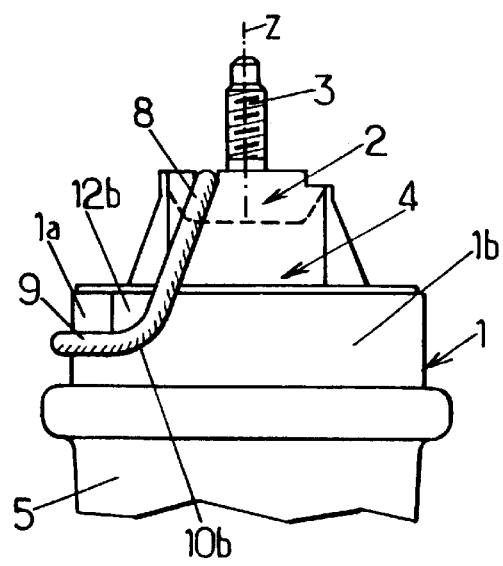
Figure 3B:
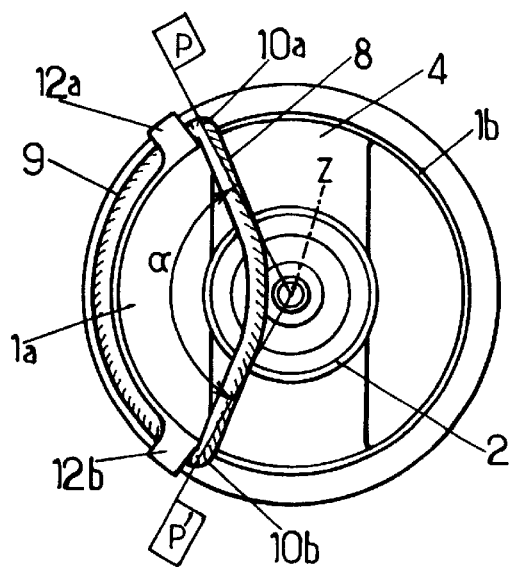

With reference to FIGS. 3A and 3B, the third embodiment illustrated is similar to the second and differs from it solely by a greater lateral distance between projections 12a and 12b in relation to axis Z.

In the example shown, planes P and P' form an included angle α which is equal to about 125°, allowing the dimensions of cable 7 to be reduced still further. In addition, the first part 8 of cable 7 is contained here within a plane which forms an angle with axis Z which is not zero, but is acute.

Figure 4A:
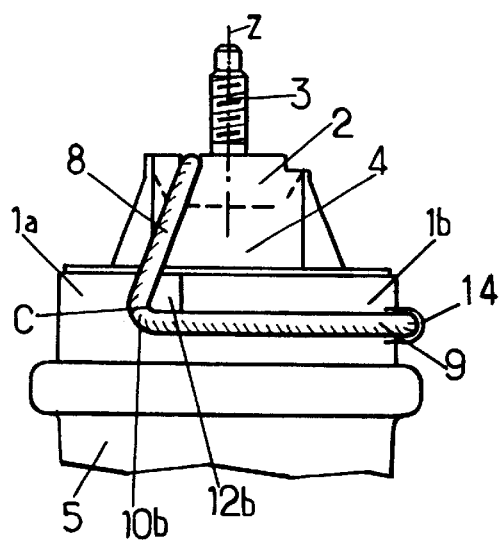
Figure 4B:
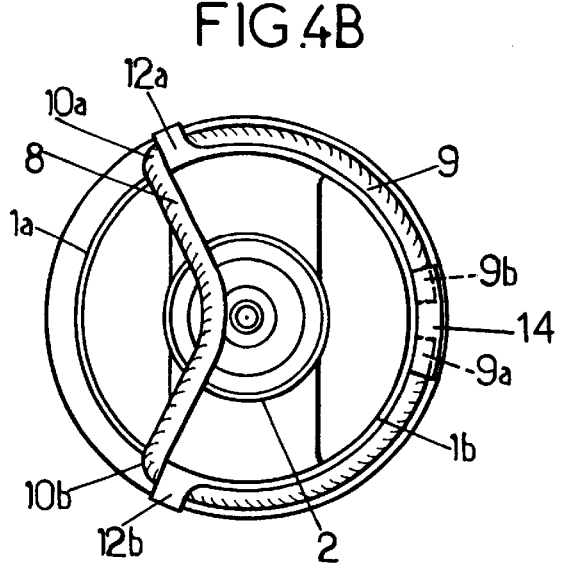

With reference to FIGS. 4A and 4B, the fourth embodiment is a variant of the preceding third embodiment, according to which the portion C of each of the projections 12a and 12b, which has a curved contour, has been reversed in relation to the curved portion C of the projections shown in FIGS. 2A to 3B, so that it is now situated furthest laterally from axis Z.

Accordingly, the dimensions of cable 7 are larger than those of the cables used in the three embodiments described above. In particular, the length of the second part 9 of cable 7 has been made such that its can wind tightly around more than the half 1b of the outer periphery of the base and therefore does not require an additional retaining element, such as, in particular, the strap 13.

Moreover, the limiting cable 7 differs from that shown in FIGS. 1 to 3 in that the second part 9 is open at the middle so as to comprise two free ends 9a and 9b which are connected by a rigid bush 14, which may, for example, be metallic, which bush is clinched on to the free ends 9a and 9b of cable 7, for example, by crimping.

Bearing in mind the disposition of cable 7 in relation to the mount and, in particular, the disposition of its free ends 9a and 9b in zones of the base 1 relatively far from the zones of the latter which are subjected to strong traction stresses, the said free ends 9a and 9b do not risk being torn off.

Figure 5A:
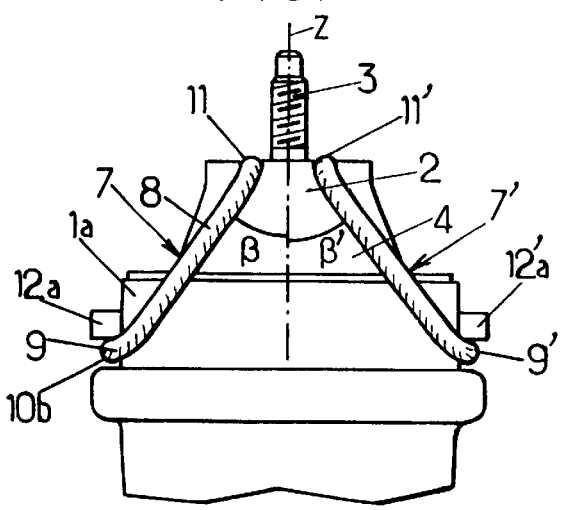
Figure 5B:
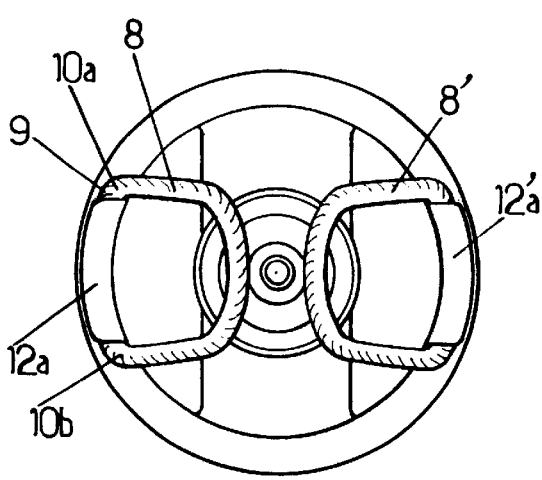

With reference to FIGS. 5A and 5B, the fifth embodiment differs from the preceding ones in that the mount is fitted with a second cable 7', and in that each cable is held in position on the mount by a single projection, 12a and 12'a respectively, instead of two.

In the example shown, the loop formed by cable 7 has substantially the shape of a rectangle the two long sides and one short side of which form the first part 8 of the cable 7, the other short side forming the second part 9 of cable 7.

The first part 8 of cable 7 is so dimensioned that in the operating position its short side is held in the groove 11 in the head 2 and in that its long sides extend towards the base 1 in a plane forming an acute angle β in relation to the central axis Z.

The cable 7 is hooked on to the base 1 by its second part 9, which passes below and along the projection 12a, which projection extends over a longer section of the outer periphery of the base 1 than does either of the projections shown in FIGS. 1 to 4.

The cable 7', in the same way as cable 7, forms a substantially rectangular loop the two long sides and one short side of which form the first part 8' of cable 7', the other short side forming the second part 9' of cable 7'.

The first part 8' of cable 7' is so dimensioned that in the operating position its short side is held in a groove 11' formed in the head 2 in a direction substantially parallel to the groove 11, and in that its long sides extend towards the base 1 in a plane forming an acute angle β' in relation to the central axis Z.

The cable 7' is hooked on to the base 1 by its second part 9', which passes below and along the projection 12'a, which projection, in this example, is diametrically opposite to the projection 12a.

Figure 6:
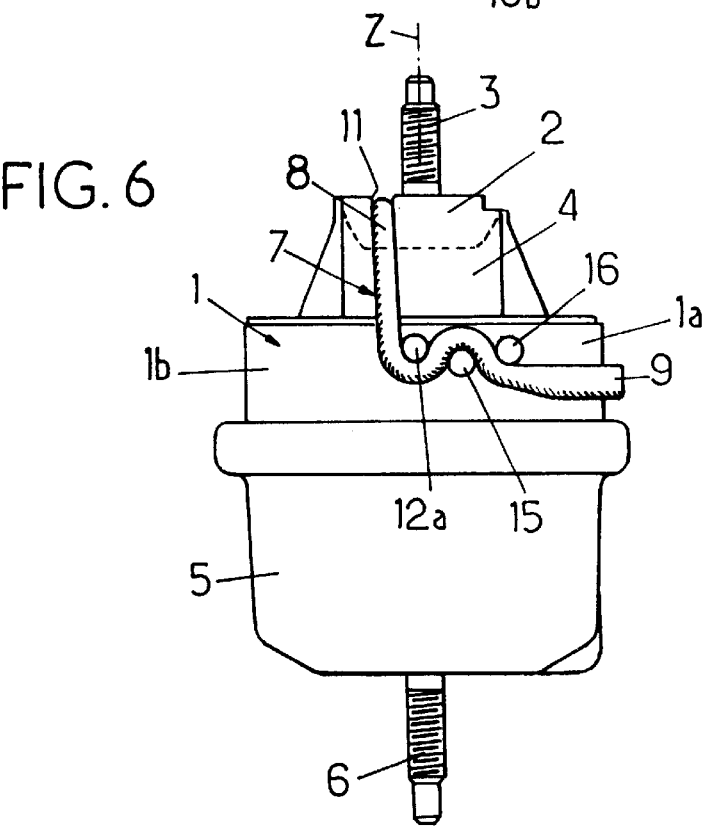
FIG. 6 is a side view of a sixth embodiment of the invention.

In a another, particular advantageous embodiment of the anti-vibration mount according to the invention, which embodiment is shown in FIG. 6, the cable 7 of the anti-vibration mount does not have an elastic strap 13. The function performed by the strap 13 is now fulfilled by at least one pair of rigid and fixed projections of a kind analogous to the projections 12a and 12b, for example, two pairs of projections 15, 16 (only one projection of each pair is shown, the other projection 15, 16 of each pair extending on the opposite side of the base 1). The projections 15 and 16 are positioned successively on the right-hand half 1a of the outer reinforcing ring 1, starting from projection 12a (and from projection 12b respectively). The projection 15 is slightly offset, for example, downwardly, in relation to the projections 12 and 16, so that the second part of cable 7 winds around these projections. Bearing in mind this winding effect of cable 7, the said cable is retained more strongly around the base 1.

It is self-evident that the embodiments of the invention described above have bee given in a purely indicative and in no way limiting sense, and that numerous modifications could easily be made by those skilled in the art without passing outside the scope of the invention.

Thus, in the case where cable 7 is formed in one piece with the strap 13, it might be useful to provide a further cable similar to cable 7 and so positioned as to be diametrically opposite to it, enabling the retaining force between the base 1 and the head 2 to be doubled.

More particularly in the case of the embodiment shown in FIGS. 5A and 5B, two further cables in addition to cables 7 and 7' might be used, so as to surround substantially the entire periphery of the anti-vibration mount and thus perfectly to limit the displacement between the base 1 and the head 2.

In general, one might also envisage clipping each of the projections 12a, 12'a 12b, 15 and 16 to the section 9 of cable 7 so as to hold the latter still more strongly in position in relation to the anti-vibration mount. Still with the aim of holding cable 7 more strongly in position in relation to the anti-vibration mount, one might also envisage covering the assembly formed by the base 1, the head 2 and the cable 7 by a cap of a kind similar to the cap 5, which would press the cable 7 against, in particular, the base 1.

Finally, in the case where cable 7 has two free ends 9a and 9b, it would be possible to omit the crimped bush 14, the said free ends being fixed together by integral molding with elastomer or plastic.

We claim:

1. Anti-vibration mount intended to be interposed between two rigid elements to damp vibrations between said two elements, essentially along a central axis, said mount comprising:

an elastomer body substantially centred on the central axis;

a rigid base which is fixed to the elastomer body and which comprises an outer annular periphery surrounding said elastomer body, said periphery extending substantially in a plane perpendicular to the central axis, said annular periphery surrounding the central axis and including at least a first portion which is oriented racially outwardly relative to said central axis;

a rigid head fixed to the elastomer body and offset from the base along the central axis;

a first mount part extending on a section of the mount height, axially from the head to said periphery;

a second mount part opposite said head relative to said periphery; and at least a first non-extensible cable forming a loop which is fixed to the base and to the head to limit the distance between said base and said head, the first cable surrounding the anti-vibration mount on only the first mount part so that the second mount part can be left completely free, said first cable comprising:

a first part which is held to the head by winding around said head and which extends towards the base, starting from the said head; and a second part which runs along at least said first portion of the periphery of the base, said second part of the cable bearing radially inwardly on said first portion of the periphery of the base, said second part complementing the first part of the first cable to form said loop formed by the first able, the second part of the first cable winding around at leas a first return element forming part of the periphery of the base, level with two joints between said second part and the first part of the cable, the first cable being so restrained by the first return element that said first return element prevents any displacement of the second part of the first cable towards the head.

2. Mount according to claim 1, in which the second part of the first cable extends in a plane substantially perpendicular to the central axis.

3. Mount according to claim 1, in which the first cable is formed in one piece.

4. Mount according to claim 1, in which said first return element is formed by a rigid and fixed projection.

5. Mount according to claim 1, in which the first cable is held in position in relation to the mount by retaining means.

6. Mount according to claim 1, in which a second nonextensible cable analogous to the first cable is fixed to the base and to the head opposite to the first cable in relation to the central axis.

7. Anti-vibration mount intended to be interposed between two rigid elements to damp vibrations between these two elements, essentially along a central axis, this mount comprising:

an elastomer body substantially centered on the central axis;

a rigid base which is fixed to the elastomer body and which comprises an outer annular periphery surrounding the said elastomer body, this periphery extending substantially in a plane perpendicular to the central axis;

a rigid head fixed to the elastomer body and offset from the base along the central axis; and at least a first non-extensible cable forming a loop which is fixed to the base and to the head to limit the distance between said base and said head, the first cable comprising:

a first part which is held to the head by winding around said head and which extends towards the base, starting from the said head; and a second part which runs along at least a first portion of the periphery of the base, said second part complementing the first part of the first cable to form said loop formed by the first cable, the first cable thus being entirely comprised between the periphery of the base and the head, the second part of the first cable winding around at least a first return element forming part of the periphery of the base, level with two joints between said second part and the first part of the cable, the first cable being so restrained by the first return element that said first return element prevents any displacement of the second part of the first cable towards the head, wherein the two joints between the first and second parts of the first cable are contained respectively in the first and second intersecting planes which pass through the central axis and which form an included first angle, between the first and second intersecting planes, of between about 90° and about 180°.

8. Mount according to claim 7, in which the first angle is of between about 160° and about 180°, so that the first part of the first cable extends in a plane substantially parallel to the central axis and adjacent to this central axis.

9. Anti-vibration mount intended to be interposed between two rigid elements to damp vibrations between said two elements, essentially along a central axis, said mount comprising:

an elastomer body substantially centred on the central axis;

a rigid base which is fixed to the elastomer body and which comprises an outer annular periphery surrounding said elastomer body, said periphery extending substantially in a plane perpendicular to the central axis, said annular periphery surrounding the central axis and including at least a first portion which is oriented radially outwardly relative to said central axis;

a rigid head fixed to the elastomer body and offset from the base along the central axis;

a first mount part extending on a section of the mount height, axially from the head to said periphery;

a second mount part opposite said head relative to said periphery; and at least, a first non-extensible cable forming a loop which is fixed to the base and to the head to limit the distance between said base and said head, the first cable surrounding the anti-vibration mount on only the first mount part so that the second mount part can be left completely free, said first cable comprising:

a first part which is held to the head by winding around said head and which extends towards the base, starling from the said head; and a second part which runs along at least said first portion of the periphery of the base, said second part of the cable bearing radially inwardly on said first portion of the periphery of the base, said second part complementing the first part of the first cable to form said loop formed by the first cable, the second part of the first cable winding around at least a first return element forming part of the periphery of the base, level with two joints between said second part and the first part of the cable, the first cable being so restrained by the first return element that said first return element prevents any displacement of the second part of the first cable towards the head, wherein slid first part of the first cable extends in a plane forming an acute second angle with the central axis.

10. Anti-vibration mount intended to be interposed between two rigid elements to damp vibrations between these two elements, essentially along a central axis, this mount comprising:

an elastomer body substantially centered on the central axis;

a rigid base which is fixed to the elastomer body and which comprises an outer annular periphery surrounding the said elastomer body, this periphery extending substantially in a plane perpendicular to the central axis;

a rigid head fixed to the elastomer body and offset from the base along the central axis; and at least a first non-extensible cable forming a loop which is fixed to the base and to the head to limit the distance between said base and said head, the first cable comprising:

a first part which is held to the head by winding around said head and which extends towards the base, starting from the said head; and a second part which runs along at least a first portion of the periphery of the base, said second part complementing the first part of the first cable to form said loop formed by the first cable, the first cable thus being entirely comprised between the periphery of the base and the head, the second part of the first cable winding around at least a first return element forming part of the periphery of the base, level with two joints between said second part and the first part of the cable, the first cable being so restrained by the first return element that said first return element prevents any displacement of the second part of the first cable towards the head, wherein the first cable comprises, in the vicinity of the middle of said second part, two free ends which are connected by a connecting means.

11. Anti-vibration mount intended to be interposed between two rigid elements to damp vibrations between these two elements, essentially along a central axis, this mount comprising:

an elastomer body substantially centered on the central axis;

a rigid base which is fixed to the elastomer body and which comprises an outer annular periphery surrounding the said elastomer body, this periphery extending substantially in a plane perpendicular to the central axis;

a rigid head fixed to the elastomer body and offset from the base along the central axis; and at least a first non-extensible cable forming a loop which is fixed to the base and to the head to limit the distance between said base and said head, wherein the first cable is held in position in relation to the mount by retaining means, the first cable comprising:

a first part which is held to the head by winding around said head and which extends towards the base, starting from the said head; and a second part which runs along at least a first portion of the periphery of the base, said second part complementing the first part of the first cable to form said loop formed by the first cable, the first cable thus being entirely comprised between the periphery of the base and the head, the second part of the first cable winding around at least a first return element forming part of the periphery of the base, level with two joints between said second part and the first part of the cable, the first cable being so restrained by the first return element that said first return element prevents any displacement of the second part of the first cable towards the head, wherein the retaining means are constituted by an elastically deformable strap which has two ends integrated with the first cable in the vicinity of the two joints between the first and second parts of the first cable respectively, this elastically deformable strap being positioned around a second portion of the periphery of the base, this second portion being complementary to the said first portion of the periphery of the base.

12. Anti-vibration mount intended to be interposed between two rigid elements to damp vibrations between these two elements, essentially along a central axis, this mount comprising:

an elastomer body substantially centered on the central axis;

a rigid base which is fixed to the elastomer body and which comprises an outer annular periphery surrounding the said elastomer body, this periphery extending substantially in a plane perpendicular to the central axis;

a rigid head fixed to the elastomer body and offset from the base along the central axis; and at least a first non-extensible cable forming a loop which is fixed to the base and to the, head to limit the distance between said base and said head, wherein the first cable is held in position in relation to the mount by retaining means, the first cable comprising:

a first part which is held to the head by winding around said head and which extends towards the base, starting from the said head; and a second part which runs along at least a first portion of the periphery of the base, said second part complementing the first part of the first cable to form said loop formed by the first cable, the first cable thus being entirely comprised between the periphery of the base and the head, the second part of the first cable winding around at least a first return element forming part of the periphery of the base, level with two joints between said second part and the first part of the cable, the first cable being so restrained by the first return element that said first return element prevents any displacement of the second part of the first cable towards the head, wherein the retaining means comprise at least two second return elements which are located in fixed positions on the periphery of the base, in the vicinity of the two joints between the first and second parts of the first cable respectively, and which extend outwardly in two opposed directions, the second part of the cable winding between the first and second return elements along a sinuous path.

13. Mount according to claim 12, in which the retaining means comprise at least two third return elements which are located in fixed positions on the periphery of the base, in the vicinity of the second return elements respectively, and which extend outwardly in two opposed directions, the first part of the cable winding between the second and third return elements along a sinuous path.

14. Anti-vibration mount intended to be interposed between two rigid elements to damp vibrations between these two elements, essentially along a central axis, this mount comprising:

an elastomer body substantially centered on the central axis;

a rigid base which is fixed to the elastomer body and which comprises an outer annular periphery surrounding the said elastomer body, this periphery extending substantially in a plane perpendicular to the central axis;

a rigid head fixed to the elastomer body and offset from the base along the central axis; and at least a first non-extensible cable forming a loop which is fixed to the base and to the head to limit the distance between said base and said head, the first cable comprising:

a first part which is held to the head by winding around said head and which extends towards the base, starting from the said head; and a second part which runs along at least a first portion of the periphery of the base, said second part complementing the first part of the first cable to form said loop formed by the first cable, the first cable thus being entirely comprised between the periphery of the base and the head, the second part of the first cable winding around at least a first return element forming part of the periphery of the base, level with two joints between said second part and the first part of the cable, the first cable being so restrained by the first return element that said first return element prevents any displacement of the second part of the first cable towards the head, wherein the periphery of the base is fitted with two first return elements extending outwardly in two opposed directions respectively, said first part of the first cable being restrained by said first return elements level with each of the two joints with the second part of the first cable respectively.

* * * * *

UNITED STATES PATENT AND TRADEMARK OFFICE
CERTIFICATE OF CORRECTION

PATENT NO. : 6,446,947 B1
DATED : September 10, 2002
INVENTOR(S) : Gilles Sauvat et al.

It is certified that error appears in the above-identified patent and that said Letters Patent is hereby corrected as shown below:

Column 7,
Line 27, please replace "formed by the first able" with -- formed by the first cable --
Line 28, please replace "winding around at leas" with -- winding around at least --

Column 8,
Line 65, please replace "wherein slid first part" with -- wherein said first part --

Signed and Sealed this

Twenty-fifth Day of March, 2003

JAMES E. ROGAN
*Director of the United States Patent and Trademark Office*

UNITED STATES PATENT AND TRADEMARK OFFICE
CERTIFICATE OF CORRECTION

PATENT NO.    : 6,446,947 B1
DATED         : September 10, 2002
INVENTOR(S)   : Gilles Sauvat et al.

It is certified that error appears in the above-identified patent and that said Letters Patent is hereby corrected as shown below:

<u>Column 7,</u>
Line 27, please replace "formed by the first able" with -- formed by the first cable --
Line 29, please replace "winding around at leas" with -- winding around at least --

<u>Column 8,</u>
Line 7, please replace "and to the, head" with -- and to the head --
Line 23, please replace "starling from" with -- starting from --
Line 65, please replace "wherein slid first part" with -- wherein said first part --

Signed and Sealed this

Twenty-ninth Day of April, 2003

JAMES E. ROGAN
*Director of the United States Patent and Trademark Office*